United States Patent
Brown et al.

(10) Patent No.: US 8,621,253 B1
(45) Date of Patent: Dec. 31, 2013

(54) PROCESSOR BOOST BASED ON USER INTERFACE DEMAND

(75) Inventors: Jeff Brown, Mountain View, CA (US); Mathias Agopian, Mountain View, CA (US); Todd Poynor, Cupertino, CA (US)

(73) Assignee: Google Inc., Mountain View, CA (US)

( * ) Notice: Subject to any disclaimer, the term of this patent is extended or adjusted under 35 U.S.C. 154(b) by 131 days.

(21) Appl. No.: 13/533,395

(22) Filed: Jun. 26, 2012

(51) Int. Cl.
| G06F 1/26 | (2006.01) |
| G06F 1/32 | (2006.01) |
| H04N 5/04 | (2006.01) |
| H04N 5/06 | (2006.01) |

(52) U.S. Cl.
USPC .......... 713/320; 713/300; 713/400; 713/500; 713/600; 348/500; 348/521; 348/547

(58) Field of Classification Search
USPC .......... 713/300, 320, 400, 500, 600; 348/500, 348/521, 547
See application file for complete search history.

(56) References Cited

U.S. PATENT DOCUMENTS

| 5,483,464 | A | * | 1/1996 | Song ............................. 713/300 |
| 5,696,978 | A | * | 12/1997 | Nishikawa .................... 713/324 |
| 6,404,423 | B1 | * | 6/2002 | Kivela et al. .................. 345/212 |
| 7,334,145 | B2 | | 2/2008 | Grobman |
| 7,500,124 | B2 | * | 3/2009 | Seo ............................... 713/322 |
| 7,739,532 | B2 | | 6/2010 | Grobman |
| 8,001,402 | B2 | | 8/2011 | Kashyap et al. |
| 2007/0234357 | A1 | | 10/2007 | Grobman |
| 2011/0004575 | A1 | | 1/2011 | Yang et al. |
| 2011/0035609 | A1 | * | 2/2011 | Brown et al. ................. 713/300 |
| 2012/0144224 | A1 | * | 6/2012 | Machnicki et al. ........... 713/500 |

* cited by examiner

Primary Examiner — Mark Connolly
(74) Attorney, Agent, or Firm — McDonnell Boehnen Hulbert & Berghoff LLP

(57) ABSTRACT

A method and system for boosting a clock frequency for a processor in a mobile device based on user interface (UI) demand are described. In response to a user interaction through a UI in the mobile device, a vertical synchronization pulse request is made by an application and an indication of such request can be provided to a governor. The governor can adjust a clock frequency of a processor in the mobile device based on the generated indication. The processor can be a central processing unit or a graphics processing unit. The clock frequency can be boosted to a higher frequency to increase the processing capabilities of the mobile device to handle the computational requirements of the user interaction. Some time after boosting the clock frequency of the processor, the governor can return to normal operations in which the clock frequency scaling is typically based on a measured system load.

22 Claims, 11 Drawing Sheets

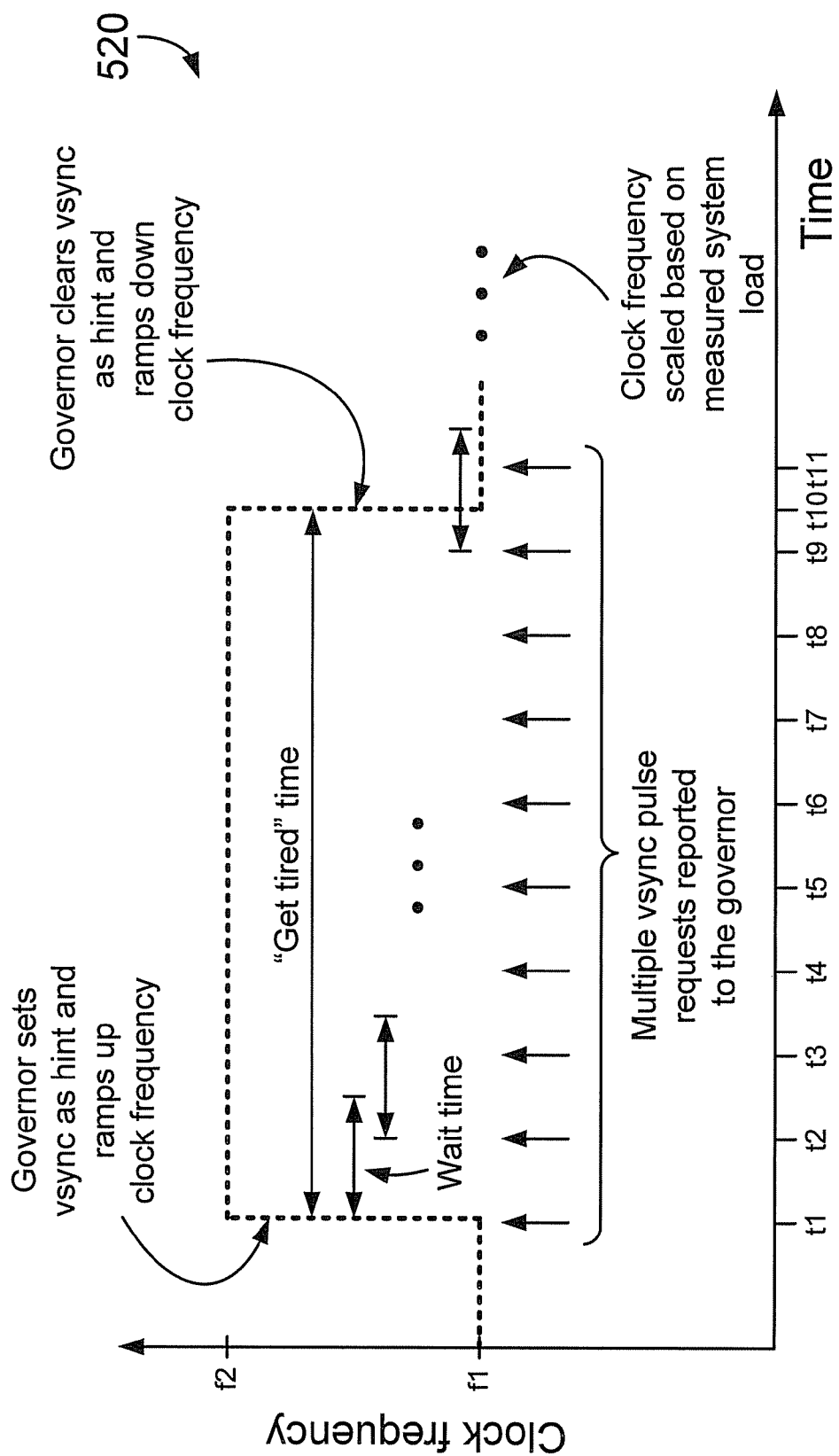

PROCESSOR BOOST BASED ON USER INTERFACE DEMAND

FIELD OF TECHNOLOGY

Certain implementations described in the disclosure relate to clock frequency scaling. More specifically, certain implementations described in the disclosure relate to a method and system for boosting a clock frequency for a processor in a mobile device based on user interface demand.

BACKGROUND

On devices with a limited power budget, such as mobile devices, it is important to manage power consumption to preserve battery life. Mobile devices, therefore, tend to have various mechanisms to adjust the processing capabilities that are made available at any given time based on the amount of power stored in the battery and on user demand.

Further limitations and disadvantages of conventional and traditional approaches will become apparent to one of skill in the art, through comparison of such systems with some aspects of the present disclosure as set forth in the remainder of the present application with reference to the drawings.

SUMMARY OF THE DISCLOSURE

A method is provided in which, in a mobile device including a processor, an indication that a vertical synchronization pulse has been requested by an application can be generated. A clock frequency corresponding to the processor can be adjusted based on the generated indication.

A system is provided in which a mobile device is operable to generate an indication that a vertical synchronization pulse has been requested by an application. The mobile device is operable to adjust a clock frequency corresponding to a processor included within the mobile device based on the generated indication.

Another method is provided in which, in a mobile device including a processor, a display compositor can generate an indication that a vertical synchronization pulse has been requested by an application. A scaling governor can dynamically adjust a clock frequency corresponding to the processor based on the generated indication.

These and other advantages, aspects and novel features of the present disclosure, as well as details of illustrated implementations thereof, will be more fully understood from the following description and drawings.

BRIEF DESCRIPTION OF SEVERAL VIEWS OF THE DRAWINGS

FIGS. 5A-5C are each a timing diagram that illustrates an example of clock frequency scaling when one or more indications for vertical synchronization pulse requests are received by the governor.

DETAILED DESCRIPTION OF THE DISCLOSURE

Figure 1:
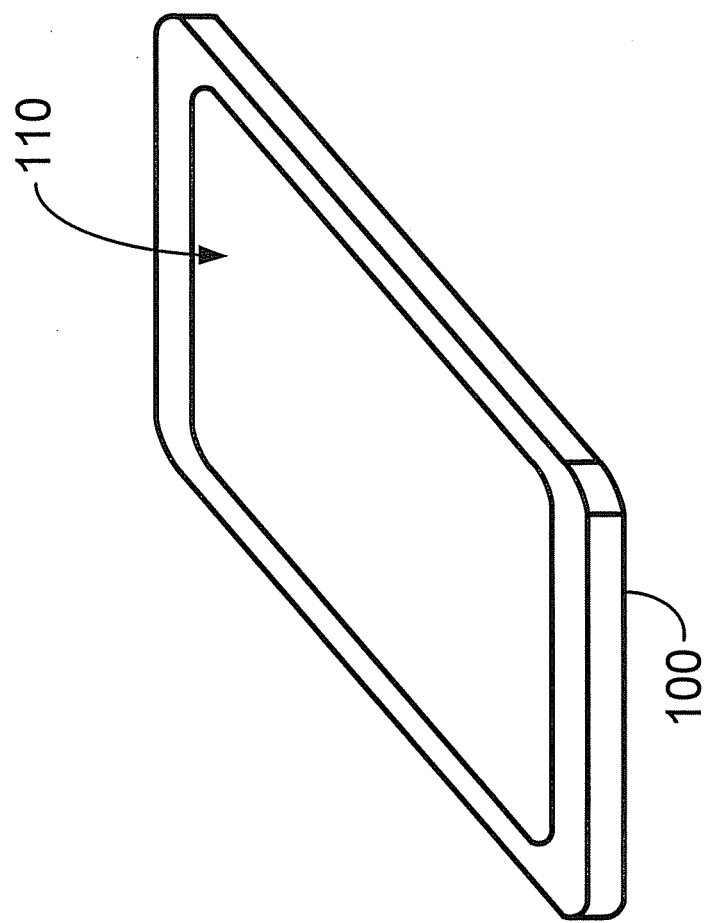
FIG. 1 is a diagram that illustrates a mobile device that is operable to support clock frequency boost based on user interface demand.

Certain implementations described in the disclosure relate to a method and system for boosting a clock frequency for a processor in a mobile device based on user interface demand. Various implementations provide for generating an indication that a vertical synchronization (vsync) pulse has been requested by an application in the mobile device in response to user interaction. Based on the generated indication, the clock frequency of the processor can be adjusted to meet the additional processing requirements needed to handle the user interaction.

For devices with a limited power budget, such as mobile devices, the clock frequency of the central processing unit (CPU), the graphics processing unit (GPU), and/or the memory bus can be lowered to reduce power consumption during those periods of time when the system load is small. When measurements made show an increase in the system load, the clock frequency to one or more of the devices listed above can be increased accordingly to make more computational resources available to the system. When subsequent measurements indicate that the system load has decreased, the clock frequency can be decreased or reduced. This approach, however, can result in a significant lag between the time the system load measurement is made and the time the clock frequency is scaled to provide the necessary computational resources.

The lag that results from the time it takes to assess the system load to the time it takes to adjust or scale the clock frequency can have an effect on applications running on the mobile device because of the poor responsiveness of the applications to the user interactions.

Interactions between a user and the UI in the mobile device tend to be somewhat spontaneous. The user touches the screen of the mobile device, which can cause a UI widget to be updated or an animation to take place, requiring that new display frames be drawn. As soon as the user begins the interaction with the mobile device, the system load increases. It can take a long time after the interaction first occurs for the system load increase to be noticed by the mobile device.

Because the clock frequency of the CPU, GPU, and/or memory bus are low for some time after the user interaction as a result of existing power-conservation mechanisms, drawing new display frames can take much longer than usual and display frames may need to be skipped. For example, when clocked at a low rate, it can take 20 milliseconds to draw a new display frame on the screen of the mobile device. When clocked at a higher rate, it can take as short as 6 milliseconds to draw the same display frame. To present smooth animations and other effects, that is, to avoid having to skip frames, it may be necessary to draw a new display frame in 16 milliseconds or less, for example. While the clock frequency may be increased eventually in response to the increased system load, it may be too late to avoid skipping frames and providing a less than desirable experience to the user.

Various implementations described in this disclosure provide for using a hint or other predictor to inform the system when user interactions or animations are about to occur so that the mobile device can increase the available computational resources accordingly without a significant lag in time. The mobile device can rely on the use of hints or predictors to determine when user interactions or animations have ceased and ramp down the clock frequency to conserve power.

FIG. 1 is a diagram that illustrates a mobile device that is operable to support clock frequency boost based on user interface demand. Referring to FIG. 1, there is shown a mobile device 100 having a user interface 110. The user interface 110 can include a display screen, a touch screen, a keyboard, or a combination thereof. A user can interact with the mobile device 100 through the user interface 110. In some implementations, the user interface 110 can include a speaker and a microphone to enable audio-based user interactions.

A user interaction can occur when an application running on the mobile device 100 generates display frames that are reproduced on the screen of the user interface 110. The user then provides an input, that is, interacts with the user interface 110 in response to the information presented by the mobile device 100. The interaction can take place by touching the screen with a finger or with a stylus, by typing information using the keyboard, and/or by speaking into the microphone. As a result of the user interactions, new display frames can be generated. For example, the user can select to scroll down a web page or change to a different web page. In each of these instances, new display frames are generated and reproduced to show a different portion of a web page or to show a different web page. Similarly, when a fling takes place, an animation can be played by the application. In this case as well, new display frames are generated and reproduced. Each time a new display frame is generated, a vsync pulse request is typically made to synchronize the display frame generation.

Figure 2:
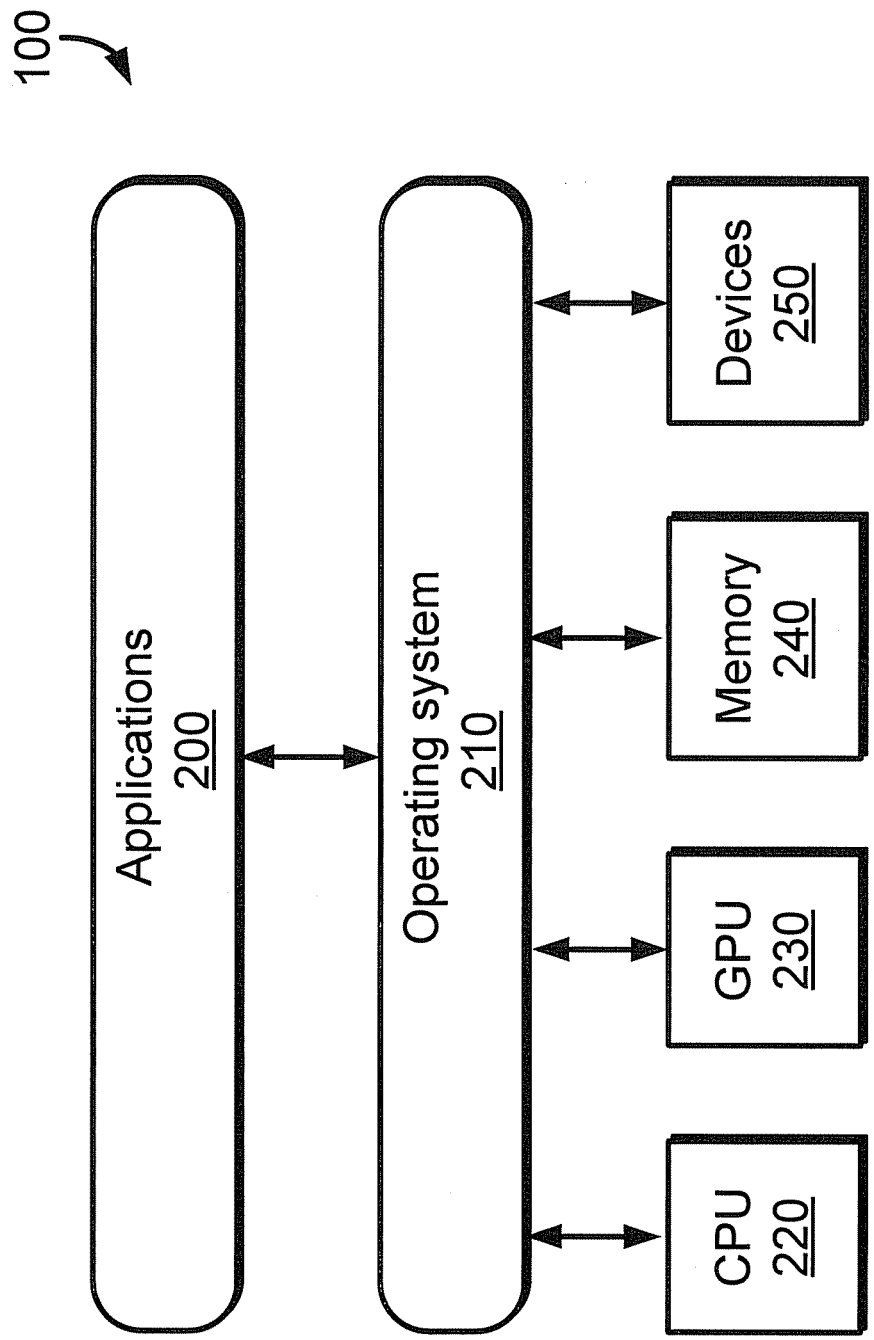
FIG. 2 is a block diagram that illustrates an example of an architecture for a mobile device that is operable to support clock frequency boost based on user interface demand.

FIG. 2 is a block diagram that illustrates an example of an architecture for a mobile device that is operable to support clock frequency boost based on user interface demand. Referring to FIG. 2, there is shown an implementation of the mobile device 100 described above with respect to FIG. 1. The mobile device 100 can include several hardware components such as a CPU 220, a GPU 230, a memory 240, and devices 250. Running on the mobile device 100 can be one or more software components such as an operating system 210 and one or more applications 200.

The CPU 220 can include one or more integrated circuits that are operable to carry out the instructions of a program or application by performing arithmetical, logical, and input/output operations. The clock frequency of the CPU 220 can be dynamically adjusted based on the processing demands required from the CPU 220 as a result of user interactions.

The GPU 230 can include one or more integrated circuits that are operable to manipulate and process data to accelerate the building of images or display frames intended for output to a display or screen in the mobile device 100. The clock frequency of the GPU 230 can be dynamically adjusted based on the processing demands required from the GPU 230 as a result of user interactions.

The memory 240 can include one or more integrated circuits that are operable to store and/or retrieve data that can be utilized in the operations performed by the CPU 220, the GPU 230, and/or the devices 250. The memory 240 can be connected to other hardware components through one or more memory buses. The clock frequency of a memory bus can be dynamically adjusted based on the data access demands required from the memory 240 as a result of user interactions.

The devices 250 can include different types of input devices, output devices, and/or input/output (I/O) devices. For example, the devices 250 can include a screen or display to reproduce display frames, a keyboard to type information, a speaker for audio reproduction, and/or a microphone for capturing audio. When the screen is a touch screen, for example, it can also be used to receive input from a user by touching a portion of the screen with a finger or with a stylus.

The operating system 210 can include software that is used to manage the various hardware resources of the mobile device 100. The operating system 210 can also be used to provide common services to computer programs or applications. The operating system 210 tends to act as an intermediary between the hardware components and the applications 200.

The applications 200 can include one or more software applications (i.e., computer programs) that help the user perform a specific task. For example, a software application can include an interactive application that displays content to a user and allows the user to provide input as to the manner in which the content is provided and/or the type of content that is provided. To perform a task (e.g., web browsing, video playback), the applications 200 can access the CPU 220, the GPU 230, the memory 240, and/or the devices 250 through the operating system 210.

Figure 3:
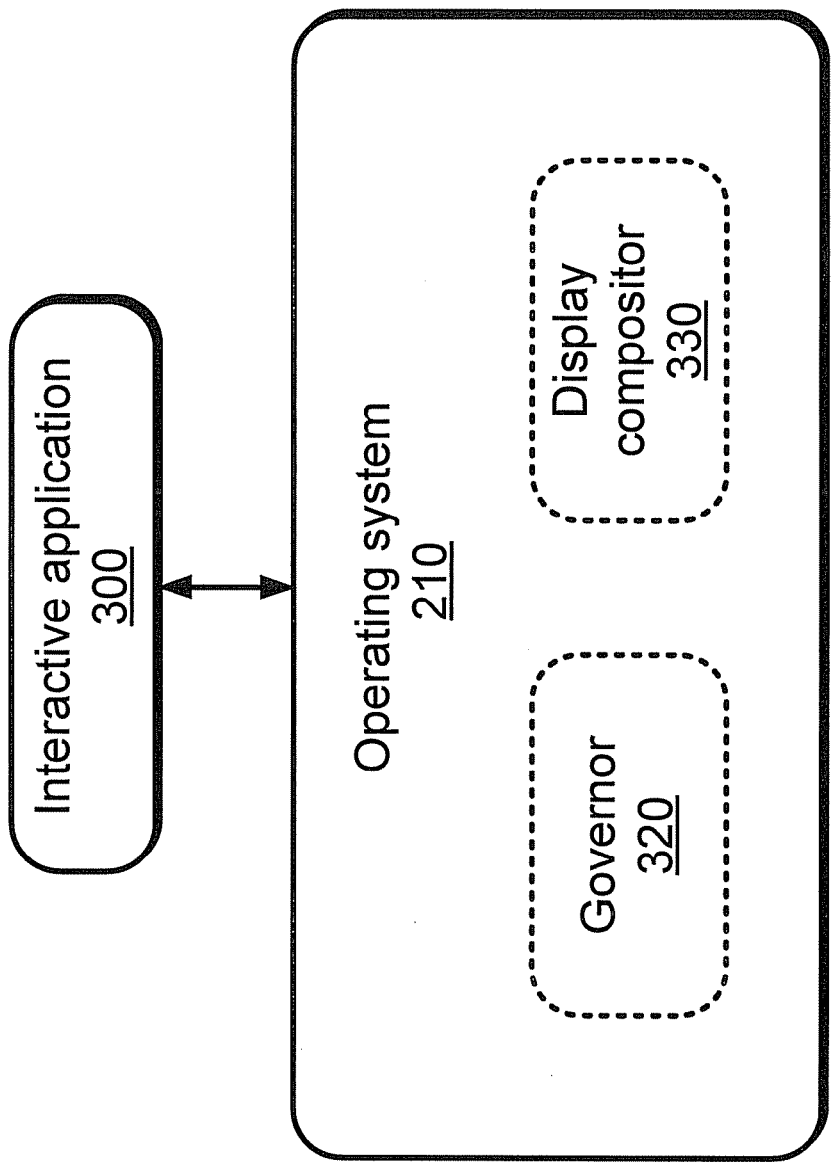
FIG. 3 is a block diagram that illustrates an example of an operating system with a governor to adjust clock frequency based on user interface demand.

FIG. 3 is a block diagram that illustrates an example of an operating system with a governor to adjust clock frequency based on user interface demand. Referring to FIG. 3, there is shown the operating system 210 described above with respect to FIG. 2. Also shown is an interactive application 300, which can be one of the applications 200 described above.

The operating system 210 can include a governor 320 and a display compositor 330. The governor 320 can be a feature of a kernel of the operating system 210 or of system software, however, it can also be implemented outside the kernel or outside system software. The kernel typically refers to the main component of the operating system 210 and can provide the connection between the interactive application 300 and the hardware resources of the mobile device (not shown). That is, the kernel can provide an abstraction layer for the hardware resources that the interactive application 300 can control to perform its functions and/or tasks.

Like the governor 320, the display compositor 330 can be implemented in the kernel or in system software, or can be implemented outside the kernel or outside system software. In the Android operating system, for example, the display compositor 330 can reside outside the kernel.

The display compositor 330 is, in one example embodiment of the disclosure, a process or piece of software that draws the display frames used in a user interface (e.g., graphical user interface) that is displayed on the screen of the mobile device. When an application, such as the interactive application 300, for example, determines that a new display frame is needed as a result of user interaction, the application makes a request for a vsync pulse. In some instances, the display compositor 330 can mediate a request for the vsync pulse. The display compositor 330 can generate an indication that the request for a vsync pulse has been made and can communicate the indication to the governor 320. The indication can include one or more signals that notify to the governor 320 that a request has been made. The display compositor 330 can then generate the vsync pulse for the application to use to draw a new display frame.

In other instances, the request for a vsync pulse can be issued directly by the application to a graphics driver (not shown), which in turn can generate an indication that the request for a vsync pulse has been made and can communicate the indication to the governor 320.

In general, what is typically needed is for lower layers, such as hardware abstraction layers, for example, to be able to communicate to the governor 320 that one or more applications, which can include the display compositor 330, are waiting for vsync pulses.

The governor, which can be referred to as a scaling governor, can be used to provide various power-management schemes for one or more of the hardware components of the mobile device 100. In normal operation, the governor 320 can scale the clock frequency of one or more processors and/or the clock frequency of a memory bus based on a measured system load. That is, when the system load increases, the governor 320 can increase the clock frequency of one or more processors and/or the clock frequency of a memory bus to a determined frequency value. Increasing the clock frequency enables additional computational resources to be made available to address the added system load requirements. Similarly, when the system load decreases, the governor 320 can decrease the clock frequency of one or more processors and/or the clock frequency of a memory bus to a determined frequency value. Decreasing the clock frequency conserves battery life when the system load requirements are low. This operation can be done dynamically such that multiple adjustments to the clock frequency can occur over time based on the measured system load.

When the governor 320 receives an indication from the display compositor 330 or from some other source (e.g., lower layer, graphics driver) that a vsync pulse has been requested by an application, the governor 320 can set or enable a flag to use the vsync pulse request as a hint or a proxy that additional computational resources are needed. In this instance, the governor 320 can ramp up or increase the clock frequency of one or more processors and/or the clock frequency of a memory bus to a determined frequency value. For example, the governor 320 can adjust the clock frequency of the CPU 220, the GPU 230, and/or a memory bus corresponding to the memory 240. Because it is not necessary to wait until a measurement shows that the system load has increased, the clock frequency is increased more rapidly when using a vsync pulse request as a hint than during normal operations. After some time, the governor 320 may not receive any more vsync pulse request indications, at which time the governor 320 can clear or disable the flag and resume normal operations. Resuming normal operations can result in the clock frequency decreasing if the current system load measurement is low or staying at an increased value if the current system load measurement is high.

The operations of the governor 320 need not be limited to adjusting the clock frequency of one or more processors and/or the clock frequency of a memory bus. For example, the governor 320 can turn ON or OFF one or more cores of the CPU 220 and/or of the GPU 230. Enabling the additional cores increases the computational resources that are available and the amount of power that is being used. Once the additional cores are no longer needed, the governor 320 can turn them OFF, reducing the amount of power being consumed.

In some instances, the governor 320 can perform voltage adjustment or enable overclocking of the hardware components. While the voltage adjustment can be performed independently of other adjustments, there may be situations in which it can be performed in connection with raising or lowering the clock frequency. For example, an increase in voltage may be needed to run the clock at a faster rate, which increases the amount of power used. While lowering the clock's rate reduces the amount of power used, also lowering the voltage provides additional power savings.

Thus, when the governor 320 receives an indication that one or more applications are waiting for a vsync pulse, the governor 320 can perform a wide range of adjustments to the system hardware (e.g., the CPU 220, the GPU 230, a memory bus corresponding to the memory 240) that affect the power state and availability of computational resources. For example, when additional computational resources are needed in response to user interactions, the governor 320 can adjust the clock frequency, the voltage, and the number of active cores in the CPU 220 and/or the GPU 230.

Although a single governor is shown in FIG. 3, other implementations can be used in which more than one governor is available in the operating system 210. For example, each of the hardware components or resources that are to have their clock frequencies adjusted can have a dedicated governor. Moreover, governors that do not support interactive operations in the manner described above can also be available in the operating system 210 and the governor 320 can be selected for operation from among the various governors available.

Figure 4A:
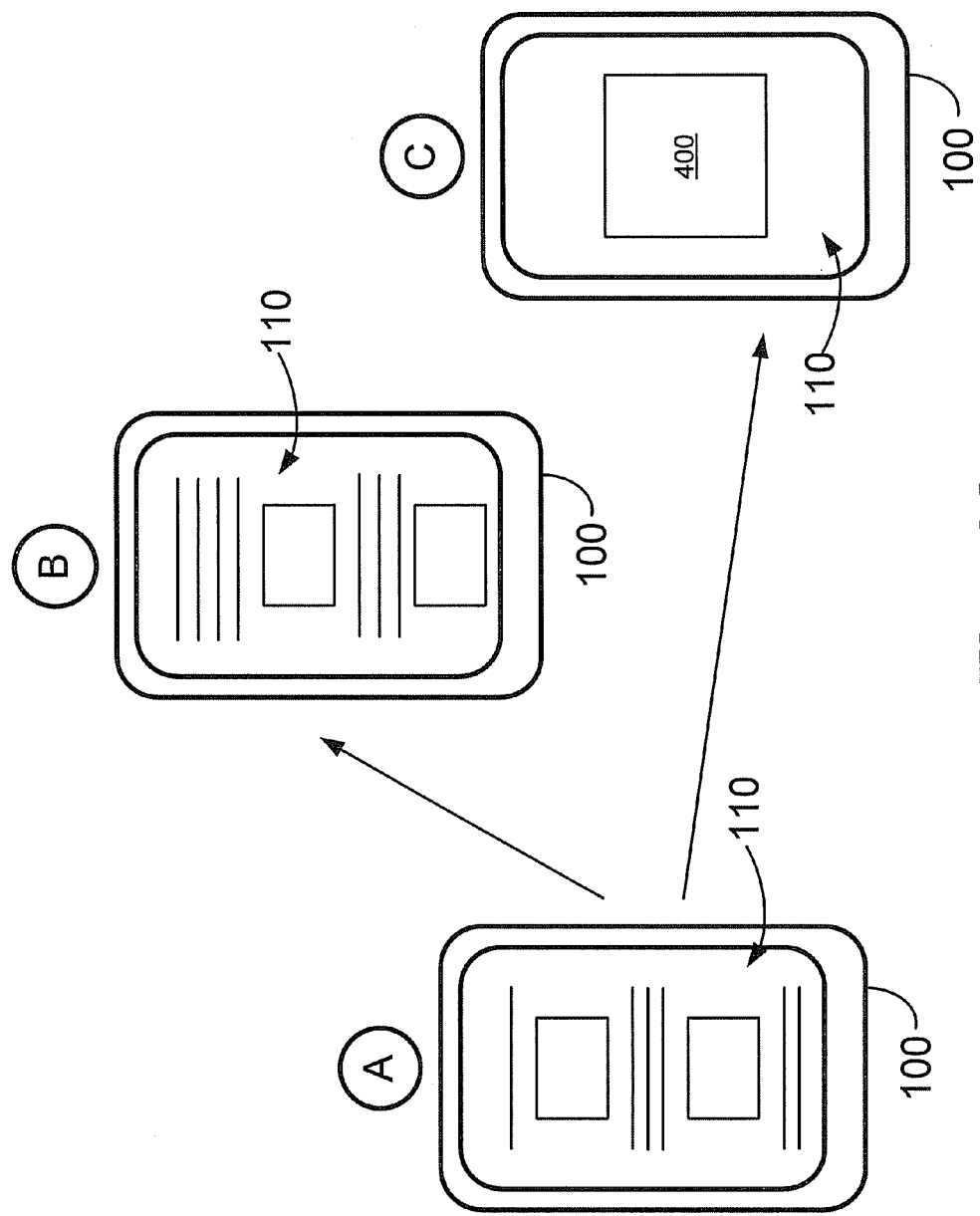
FIGS. 4A and 4B are each a diagram that illustrates examples of operating scenarios in which a vertical synchronization pulse is requested in response to user interaction.
Figure 4B:
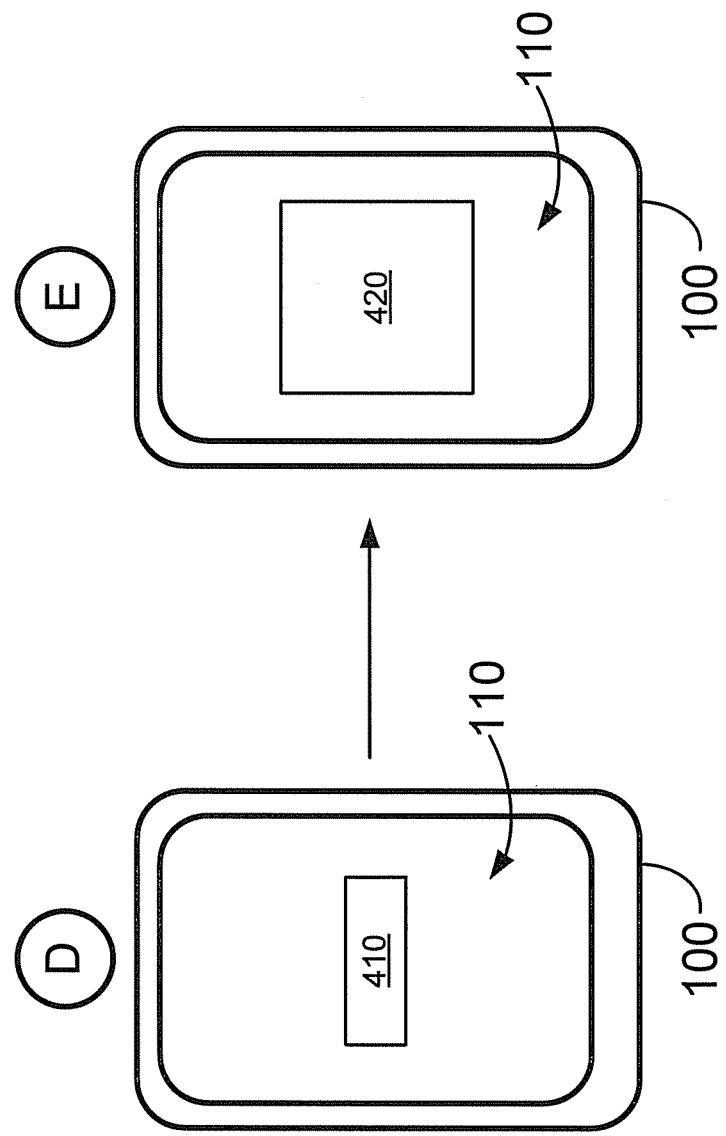

FIGS. 4A and 4B are each a diagram that illustrates examples of operating scenarios in which a vertical synchronization pulse is requested in response to user interaction. Referring to FIG. 4A, there are shown two example scenarios in which a vsync pulse request can result when a user interacts with the user interface 110 in the mobile device 100.

In a first scenario, a user may be reading a portion of a web page as illustrated by the reference A. The user may decide to scroll down to read a different portion of the web page. In this instance, the user interacts with the user interface 110 to provide input that will result in the web page scrolling down. An application, such as the interactive application 300 described above, handles the user input and determines that an update to the display is needed. The application then requests a vsync pulse from, for example, the display compositor 330. The display compositor 330 generates an indication to the governor 320 that a vsync pulse has been requested. The governor 320 ramps up the clock frequency of the CPU 220, the GPU 230, and/or a memory bus corresponding to the memory 240 to provide enough hardware resources quickly to the application. The display compositor 330 provides the vsync pulse to the application, which in turn draws a new display frame to show the scrolled-down web page in a smooth manner as illustrated by reference B. In some implementations, the governor 320 can return to normal operations automatically after about 40 milliseconds from the time the vsync pulse request indication was received.

In a second scenario, a user may be reading a portion of a web page as illustrated by the reference A. The user may decide to play an animation 400. In this instance, the user interacts with the user interface 110 to provide input that will result in the animation 400 being played. An application, such as the interactive application 300 described above, handles the user input and determines that an update to the display is needed. The application then requests a vsync pulse from, for example, the display compositor 330. The display compositor 330 generates an indication to the governor 320 that a vsync pulse has been requested. The governor 320 ramps up the clock frequency of the CPU 220, the GPU 230, and/or a memory bus corresponding to the memory 240 to provide enough hardware resources quickly to the application. The display compositor 330 provides the vsync pulse to the application, which in turn draws a new display frame to show the animation 400 in a smooth manner as illustrated by reference C. The process may be repeated multiple times while the animation 400 is played. That is, multiple vsync pulse requests can be made to the display compositor 330, which in turn may generate multiple indications to the governor 320 to maintain the clock frequencies high while the animation 400 is played. In some implementations, the governor 320 can return to normal operations automatically after about 40 milliseconds from the time the last of the vsync pulse request indications was received.

Referring to FIG. 4B, there is shown a third example scenario in which a vsync pulse request can result when a user interacts with the user interface 110 in the mobile device 100. In this example scenario, a user may interact with the user interface 110 to select an option 410 to perform a video playback 420 as illustrated by references D and E. As with the example scenarios described above with respect to FIG. 4A, the governor 320 can increase the clock frequency of one or more hardware resources quickly in response to a vsync pulse request from the display composer 330. During the video playback 420, multiple vsync pulse requests are made. However, the video playback 420 does not need the high clock frequencies that were needed for the first and second example scenarios described above. To handle this situation, the governor 320 can "get tired" after a determined amount of time has passed from the time the first of the vsync pulse request indications was received and/or a determined number of vsync pulse request indications are received.

Figure 5A:
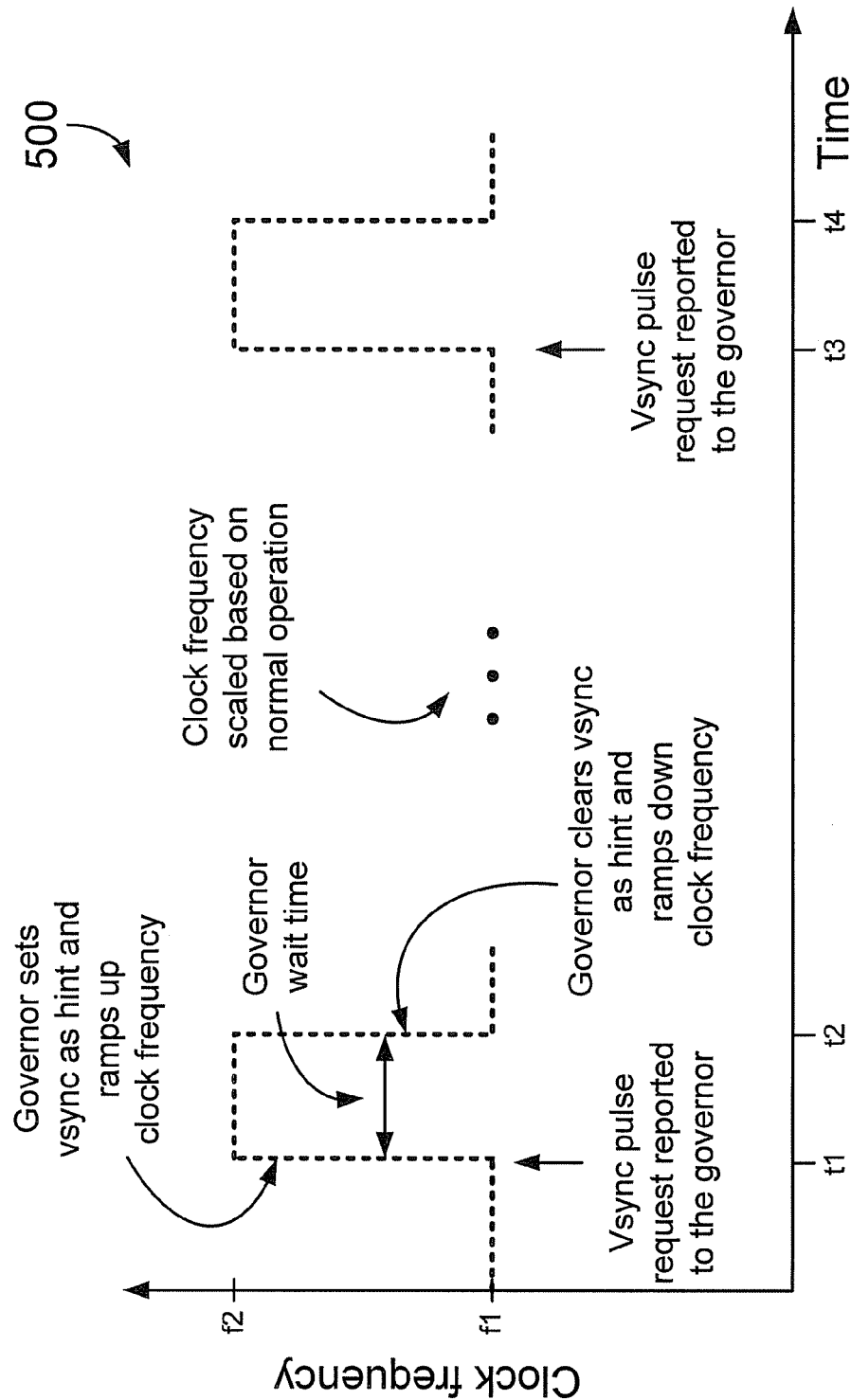
Figure 5B:
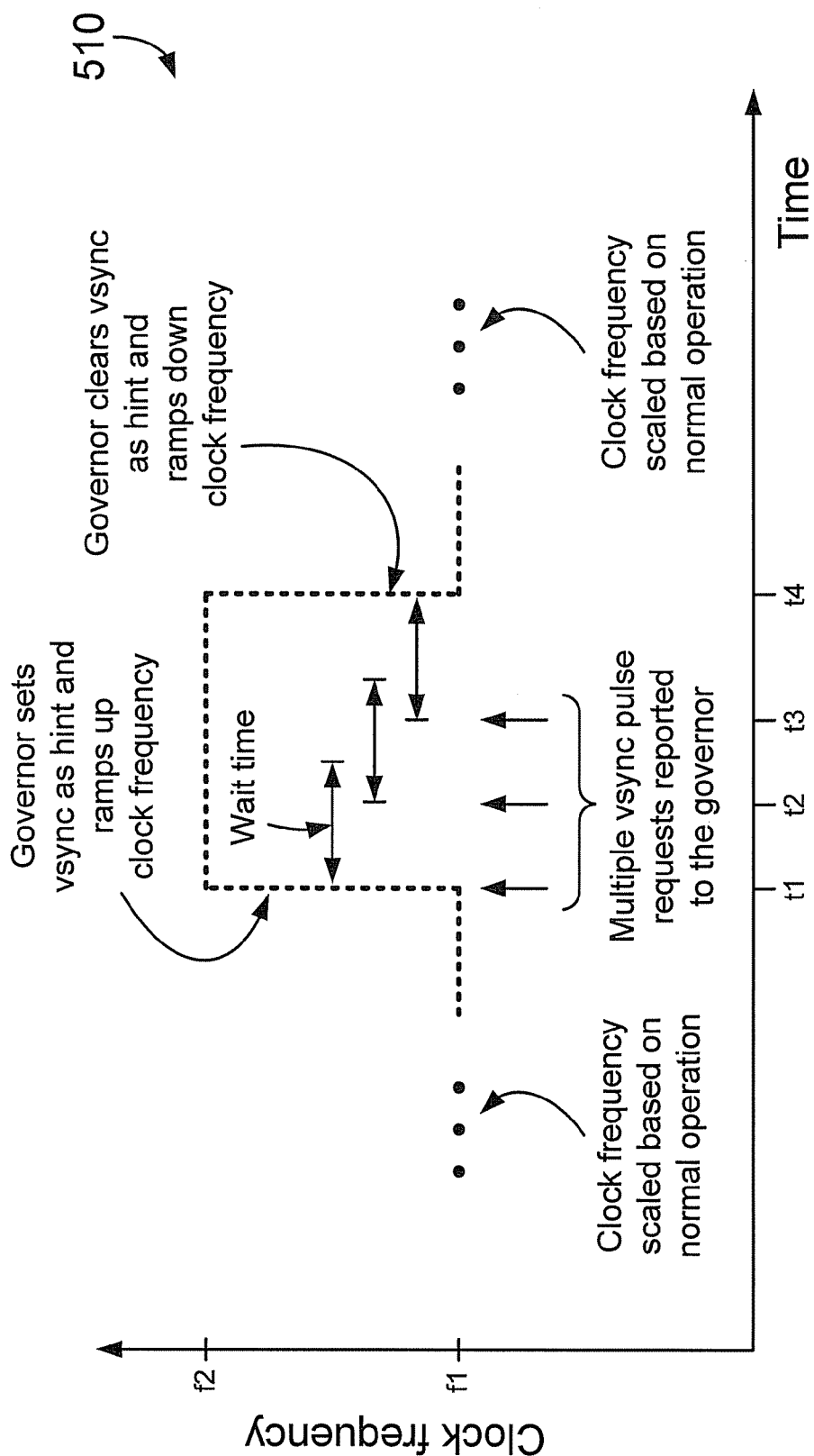

FIGS. 5A-5C are each a timing diagram that illustrates an example of clock frequency scaling when one or more indications for vertical synchronization pulse requests are received by the governor. Referring to FIG. 5A, there is shown a timing diagram 500 that corresponds to the first scenario described above with respect to FIG. 4A. In this case, the governor 320 can receive a vsync pulse request indication at time t1 and can set a flag or some other condition mark to use the indication as a hint that additional computational or processing resources are needed. As a result, the governor 320 can ramp up the clock frequency of the CPU 220, the GPU 230, and/or a memory bus corresponding to the memory 240 from a first frequency (f1) to a second frequency (f2) very rapidly. When multiple hardware resources are managed by the governor 320, the frequency scaling for each of the hardware resources can be different. For example, the first frequency and the second frequency for the CPU 220 can be different from the first frequency and the second frequency for the memory bus.

At time t2, which corresponds to a wait time used by the governor 320 after the vsync pulse request indication is received, the governor 320 can clear the flag or condition mark and can rapidly ramp down the clock frequency of the hardware resource(s). In some implementations, the wait time can be approximately 40 milliseconds, for example. At this point in time, the governor 320 can resume normal operations in which the clock frequency is scaled or adjusted based on a measured system load. For example, at time t2, the clock frequency can be reduced back to f1 or to another value that is based on the current system load measurement. When the system load measurement is high, the clock frequency after t2 can remain high even though the wait time used by the governor 320 in connection with the reception of the vsync pulse request indication has passed.

A similar clock frequency scaling operation as the one described above can occur later. For example, at time t3, the governor 320 can receive another vsync pulse request indication and the clock frequency can be increased. At time t4, after the wait time has passed, the clock frequency can be ramped down to a lower frequency value to reduce power consumption. As noted above, if after t4 the current system load measurement is high, the clock frequency may not be reduced but may be kept high to handle the computational requirements needed to address the high system load.

In one example in which the mobile phone 100 is an Android-based phone that includes a Texas Instruments OMAP 4460 System-on-Chip with 2 CPUs, the CPUs can run at a low speed of 350 MHz and the memory bus at 100 MHz when the system is mostly inactive. After a user input is detected and a vsync pulse request indication is generated, the governor can ramp up the CPUs to 700 MHz and the memory bus to 200 MHz in about 1 millisecond from the reception of the indication.

In this example, when the speeds of the CPUs are 350 MHz, the core power rail of the CPUs can be set to approximately 1.025 Volts or greater. When the speeds of the CPUs are increased to 700 MHz, the core power rail can be set to approximately 1.203 Volts or greater. Because the core power rail may be shared by multiple devices, the voltages used may need to be set to a value that is sufficiently high to support the appropriate clock speeds for all of those devices.

Referring to FIG. 5B, there is shown a timing diagram 510 that corresponds to the second scenario described above with respect to FIG. 4A. In this case, the governor 320 can receive a first vsync pulse request indication at time t1 and can set a flag or some other condition mark to use the indication as a hint that additional computational or processing resources are needed. As a result, the governor 320 can ramp up the clock frequency of the CPU 220, the GPU 230, and/or a memory bus corresponding to the memory 240 from a first frequency (f1) to a second frequency (f2) very rapidly. When multiple hardware resources are managed by the governor 320, the frequency scaling for each of the hardware resources can be different. For example, the first frequency and the second frequency for the CPU 220 can be different from the first frequency and the second frequency for the memory bus.

At time t2, which occurs before the wait time corresponding to the first vsync pulse request indication has passed, a second vsync pulse request indication is received by the governor 320. Accordingly, the governor 320 maintains the clock frequency high even after the wait time corresponding to the first vsync pulse indication has passed.

At time t3, which occurs before the wait time corresponding to the second vsync pulse request indication has passed, a third vsync pulse request indication is received by the governor 320. Accordingly, the governor 320 maintains the clock frequency high even after the wait time corresponding to the second vsync pulse indication has passed.

At time t4, which corresponds to the end of the wait time for the third vsync pulse request indication received, the governor 320 can clear the flag or condition mark and can rapidly ramp down the clock frequency of the hardware resource(s). At this point in time, the governor 320 can resume normal operations in which the clock frequency is scaled or adjusted based on a measured system load.

Referring to FIG. 5C, there is shown a timing diagram 520 that corresponds to the third scenario described above with respect to FIG. 4B. In this case, the governor 320 can receive a first vsync pulse request indication at time t1 and can set a flag or some other condition mark to use the indication as a hint that additional computational or processing resources are needed. As a result, the governor 320 can ramp up the clock frequency of the CPU 220, the GPU 230, and/or a memory bus corresponding to the memory 240 from a first frequency (f1) to a second frequency (f2) very rapidly. When multiple hardware resources are managed by the governor 320, the frequency scaling for each of the hardware resources can be different. For example, the first frequency and the second frequency for the CPU 220 can be different from the first frequency and the second frequency for the memory bus.

At time t2, which occurs before the wait time corresponding to the first vsync pulse request indication has passed, a second vsync pulse request indication is received by the governor 320. Accordingly, the governor 320 maintains the clock frequency high even after the wait time corresponding to the first vsync pulse indication has passed. The same can occur at times t3, t4, t5, t6, t7, t8, and t9.

At time t10 the governor 320 gets tired, which occurs before the wait time corresponding to the ninth vsync pulse request indication has passed. That is, the governor 320 recognizes that multiple vsync pulse requests have been made continuously for a long time, which is what typically occurs when a video playback is taking place. Because a video playback does not need the type of computational resources that the other scenarios do, the governor 320 can clear the flag or condition mark and can rapidly ramp down the clock frequency to preserve battery life. At this point in time, the governor 320 can resume normal operations in which the clock frequency is scaled or adjusted based on a measured system load.

The governor 320 can get tired when the clock frequency has been held high for a determined amount of time since the first vsync pulse request indication has been received. The governor 320 can also get tired when the number of vsync pulse request indications that have been received continuously is above a threshold number. In either case, the governor 320 gets tired and ramps down the clock frequency to a frequency that is appropriate to the current system load measurement. The time corresponding to the governor 320 getting tired can be around 200 milliseconds, for example.

Note that after the governor 320 gets tired, another vsync pulse request indication is received at time t11. In this case, however, the governor 320 disregards the indication and maintains normal operations.

Figure 6:
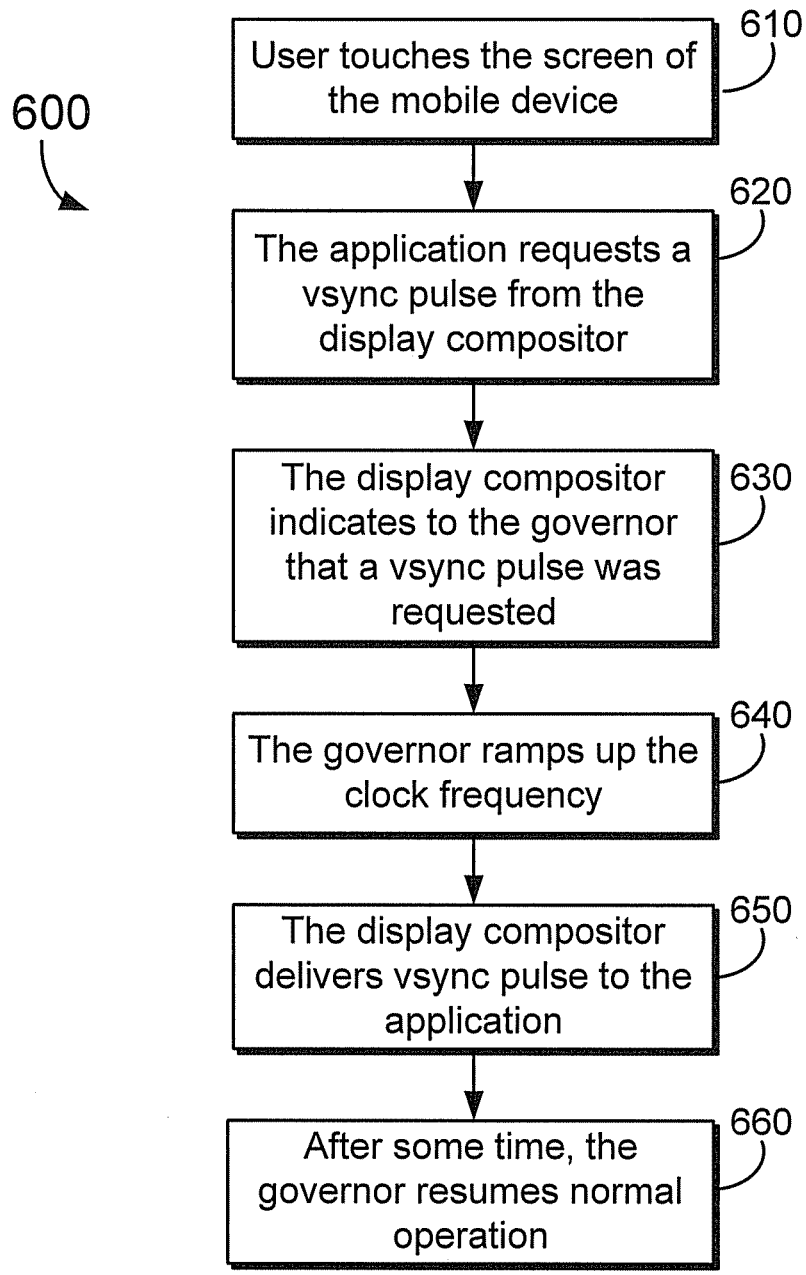
FIGS. 6-8 are each a flow diagram that illustrates examples of steps for boosting the clock frequency of a processor in response to user interface demand.
Figure 7:
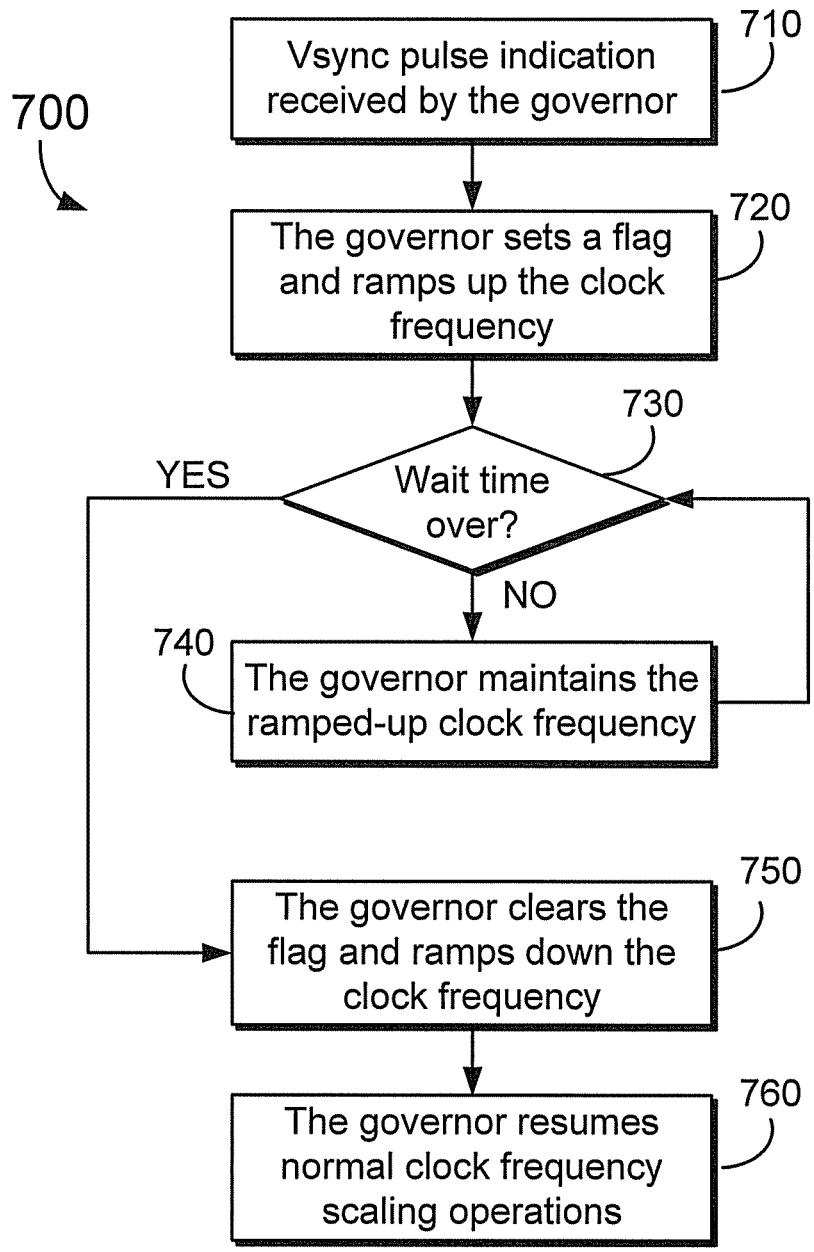
Figure 8:
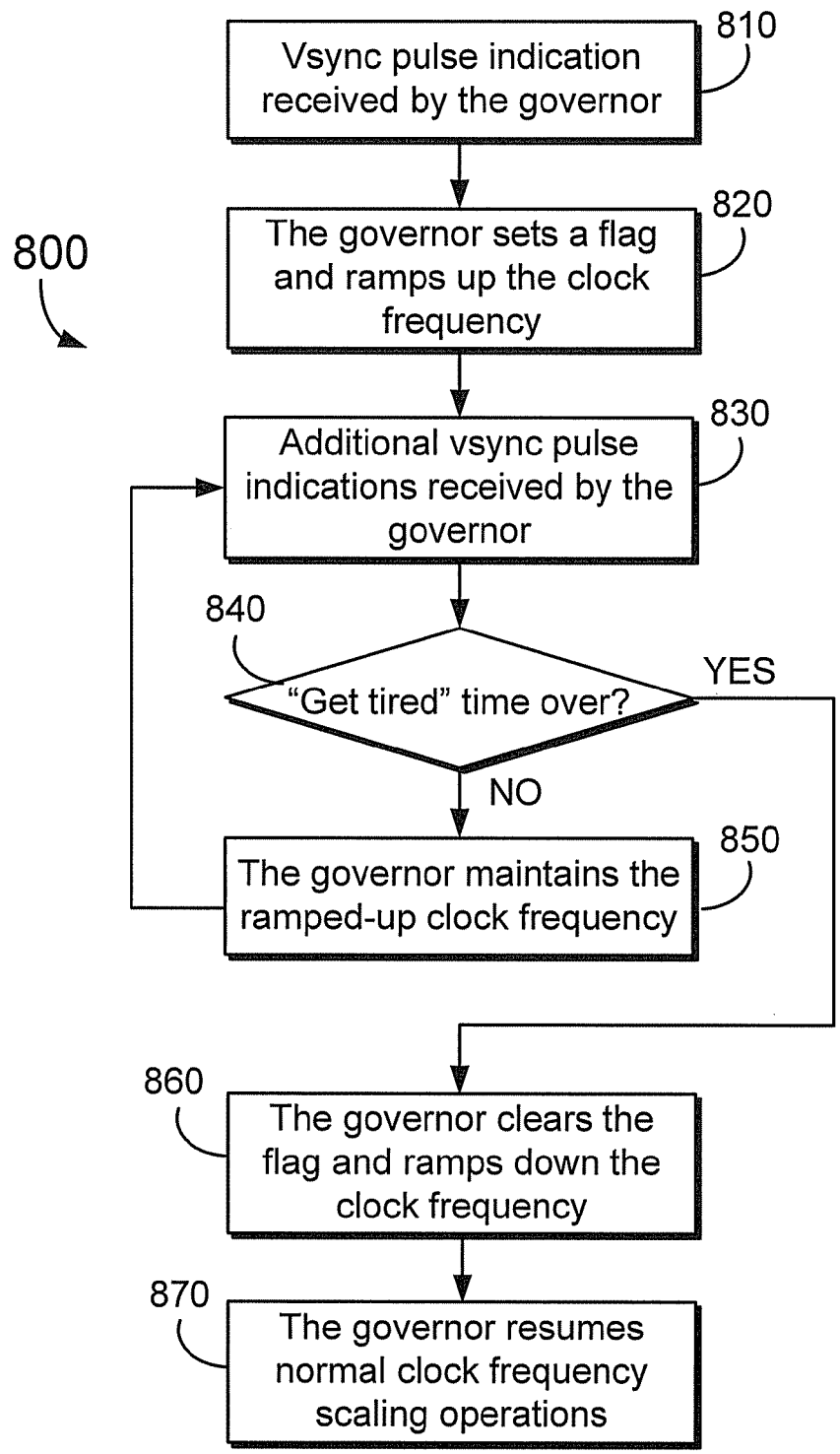

FIGS. 6-8 are each a flow diagram that illustrates examples of steps for boosting the clock frequency of a processor in response to user interface demand. Referring to FIG. 6, there is shown a flow chart 600 in which at step 610, a user can touch or contact the screen of a mobile device. For example, a user can interact with the user interface 110 of the mobile device 100 described above with respect to FIG. 1. The interaction can result in one or more new display frames being drawn on the screen. At step 620, an application (e.g., the interactive application 300) that handles the drawing of any new display frame can request a vsync pulse from a display compositor (e.g., the display compositor 330).

At step 630, the display compositor can indicate to a governor or scaling governor (e.g. governor 320) that a vsync pulse was requested. The indication can be made using one or more signals that are communicated to the governor or by marking a condition that is available to the governor for detection. At step 640, the governor can ramp up the clock frequency of one or more hardware components (e.g., the CPU 220, the GPU 230, memory bus corresponding to the memory 240). At step 650, the display compositor can deliver the vsync pulse to the application to draw a new display frame.

At step 660, when additional touches or user interactions are no longer detected within a determined amount of time, the governor can resume normal operations.

Referring to FIG. 7, there is shown a flow chart 700 in which at step 710 a vsync pulse request indication can be received by a governor (e.g., the governor 320). At step 720, the governor can set a flag or other mark and can ramp up the clock frequency of one or more hardware components (e.g., the CPU 220, the GPU 230, memory bus corresponding to the memory 240).

At step 730, when the time that the governor waits after reception of the indication is not over, the process proceeds to step 740 where the governor maintains the clock frequency at the ramped-up rate. When the time is over, the process proceeds to step 750 where the governor clears the flag or mark and ramps down the clock frequency. At step 760, the governor can resume normal clock frequency scaling operations.

Referring to FIG. 8, there is shown a flow chart 800 in which at step 810 a vsync pulse request indication can be received by a governor (e.g., the governor 320). At step 820, the governor can set a flag or other mark and can ramp up the clock frequency of one or more hardware components (e.g., the CPU 220, the GPU 230, memory bus corresponding to the memory 240).

At step 830, additional vsync pulse request indications can be received by the governor. At step 840, when a time corresponding to the governor getting tired of multiple indications has not passed, the process may proceed to step 850 where the governor can maintain the ramped-up clock frequency. After step 850, the process may proceed back to step 830. Back to step 840, when the time corresponding to the governor getting tired of multiple indications has passed, the process may proceed to step 860 where the governor clears the flag or mark and ramps down the clock frequency. At step 870, the governor can resume normal clock frequency scaling operations.

In one implementation, a mobile device (e.g., the mobile device 100) can include a processor (e.g., the CPU 220, the GPU 230). The mobile device can generate an indication that a vsync pulse has been requested by an application running on the mobile device. The mobile device can adjust a clock frequency corresponding to the processor based on the generated indication. The mobile device can include a user input interface (e.g., the user interface 110) and can receive a user input through the user input interface. The indication is generated in response to the received user input.

The clock frequency can be adjusted from a first clock frequency to a second clock frequency higher than the first clock frequency. Subsequently, the clock frequency can be adjusted from the second clock frequency to a third clock frequency that is based on a current load measurement corresponding to the processor. The adjustment from the second clock frequency to the third clock frequency can occur after a determined period of time has passed from the generation of the indication.

The mobile device can include a memory (e.g., the memory 240) and a memory bus communicatively coupled to the memory. The mobile device can adjust a clock frequency corresponding to the memory bus based on the generated indication.

The mobile device can generate an indication for each of several additional vsync pulses requested by the application. The mobile device can determine whether the number of generated indications is larger than a threshold number and when that is the case, the mobile device can adjust the clock frequency of the processor to a clock frequency that is based on a current load measurement corresponding to the processor.

Moreover, the mobile device can generate an indication for each of several additional vsync pulses requested by the application and can determine whether a determined amount of time has passed in connection with the initial generated indication and the additional generated indications. When the determined amount of time has passed, the mobile device can adjust the clock frequency of the processor to a clock frequency that is based on a current load measurement corresponding to the processor.

Another implementation provides for a non-transitory machine and/or computer readable storage and/or media, having stored thereon, a machine code and/or a computer program having at least one code section executable by a machine and/or a computer, thereby causing the machine and/or computer to perform the steps as described herein for a processor boost based on user interface demand.

Accordingly, the present disclosure can be realized in hardware, software, or a combination of hardware and software. The present disclosure can be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure can also be embedded in a computer program product, which includes all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to a particular implementation disclosed, but that the present disclosure will include all implementations falling within the scope of the appended claims.

What is claimed is:

1. A method, comprising:
in a mobile device including a processor,
generating an indication that a vertical synchronization pulse has been requested by an application;
adjusting a clock frequency corresponding to the processor based on the generated indication; and
providing the vertical synchronization pulse to the application.

2. The method of claim 1, wherein the mobile device includes a user input interface, the method comprising:
receiving a user input through the user input interface; and
generating the indication in response to the received user input.

3. The method of claim 1, wherein the processor is a central processing unit or a graphics processing unit.

4. The method of claim 1, comprising adjusting the clock frequency from a first clock frequency to a second clock frequency higher than the first clock frequency.

5. The method of claim 1, comprising:
adjusting the clock frequency from a first clock frequency to a second clock frequency higher than the first clock frequency; and
adjusting the clock frequency from the second clock frequency to a third clock frequency that is based on a current load measurement corresponding to the processor.

6. The method of claim 5, comprising adjusting the clock frequency from the second clock frequency to the third clock frequency after a determined period of time has passed from the generation of the indication.

7. The method of claim 1, wherein the mobile device includes a memory and a memory bus communicatively coupled to the memory, the method comprising adjusting a clock frequency corresponding to the memory bus based on the generated indication.

8. The method of claim 1, comprising:
generating a number of additional indications, each one of the additional generated indications being for one of a plurality of additional vertical synchronization pulses requested by the application;
determining whether the number of additional generated indications is larger than a threshold number; and
when the number of additional generated indications is larger than the threshold number, adjusting the clock frequency to a clock frequency that is based on a current load measurement corresponding to the processor.

9. The method of claim 1, wherein said indication is an initial indication and the method comprises:
generating an additional indication for each of a plurality of additional vertical synchronization pulses requested by the application;
determining whether a determined amount of time has passed in connection with the initial generated indication and the additional generated indications; and
when the determined amount of time has passed, adjusting the clock frequency to a clock frequency that is based on a current load measurement corresponding to the processor.

10. The method of claim 1, comprising providing the vertical synchronization pulse to the application after the adjusting of the clock frequency.

11. A mobile device, comprising:
at least one processor; and
a memory containing executable instructions that when executed by the at least one processor cause the mobile device to perform a method for handling user interactions, the method comprising:
generating an indication that a vertical synchronization pulse has been requested by an application,
adjusting a clock frequency corresponding to the at least one processor based on the generated indication, and
providing the vertical synchronization pulse to the application.

12. The mobile device of claim 11, wherein the mobile device includes a user input interface, the method performed by the mobile device comprising:
receiving a user input through the user input interface; and
generating the indication in response to the received user input.

13. The mobile device of claim 11, wherein the processor is a central processing unit or a graphics processing unit.

14. The mobile device of claim 11, wherein the method performed by the mobile device comprises adjusting the clock frequency from a first clock frequency to a second clock frequency higher than the first clock frequency.

15. The mobile device of claim 11, wherein the method performed by the mobile device comprises:
adjusting the clock frequency from a first clock frequency to a second clock frequency higher than the first clock frequency; and
adjusting the clock frequency from the second clock frequency to a third clock frequency that is based on a current load measurement corresponding to the processor.

16. The mobile device of claim 15, wherein the method performed by the mobile device comprises adjusting the clock frequency from the second clock frequency to the third clock frequency after a determined period of time has passed from the generation of the indication.

17. The mobile device of claim 11, wherein the mobile device includes a memory bus communicatively coupled to the memory, the method performed by the mobile device comprising adjusting a clock frequency corresponding to the memory bus based on the generated indication.

18. The mobile device of claim 11, wherein the method performed by the mobile device comprises:
generating a number of additional indications, each one of the additional generated indications being for one of a plurality of additional vertical synchronization pulses requested by the application;
determining whether the number of additional generated indications is larger than a threshold number; and
when the number of generated indications is larger than the threshold number, adjusting the clock frequency to a clock frequency that is based on a current load measurement corresponding to the processor.

19. The mobile device of claim 11, wherein said indication is an initial indication and the method performed by the mobile device comprises:
generating an additional indication for each of a plurality of additional vertical synchronization pulses requested by the application;
determining whether a determined amount of time has passed in connection with the initial generated indication and the additional generated indications; and
when the determined amount of time has passed, adjusting the clock frequency to a clock frequency that is based on a current load measurement corresponding to the processor.

20. The mobile device of claim 11, wherein the method performed by the mobile device comprises providing the vertical synchronization pulse to the application after the adjusting of the clock frequency.

21. A method, comprising:
in a mobile device including a processor,
generating by a display compositor, an indication that a vertical synchronization pulse has been requested by an application; and
dynamically adjusting by a scaling governor, a clock frequency corresponding to the processor based on the generated indication.

22. The method of claim 21, comprising disabling the scaling governor from dynamically adjusting the clock frequency based on the generated indication when a number of indications generated by the display compositor over a determined period of time is larger than a threshold number.

* * * * *